UNITED STATES PATENT OFFICE.

FRANK A. RUSS, OF WEATHERLY, PENNSYLVANIA.

AUTOMATIC AIR-BRAKE SYSTEM AND TRAIN-STOP.

1,277,261.  Specification of Letters Patent.  Patented Aug. 27, 1918.

Application filed September 15, 1916.  Serial No. 120,380.

*To all whom it may concern:*

Be it known that I, FRANK A. RUSS, a citizen of the United States, residing at Weatherly, in the county of Carbon and State of Pennsylvania, have invented new and useful Improvements in Automatic Air-Brake Systems and Train-Stops, of which the following is a specification.

This invention relates to improvements in automatic air brake systems and has particular application to a brake system and automatic train stop.

In carrying out the present invention, it is my purpose to provide an automatic air brake system whereby a service application of the brakes may be effected under certain conditions and an emergency application brought about under other conditions and whereby an emergency application of the brakes may be effected in the event of the train running by a danger signal, thereby bringing the train to a stop.

It is also my purpose to provide an automatic air brake system wherein the valve operated to effect an application of the brakes when the train runs by a danger signal may be reset after the train has been brought to a stop so that the air brake system may be restored to normal condition and the engineer regain control of the train.

With the above and other objects in view, the invention consists in the construction, combination and arrangement of parts hereinafter set forth in and falling within the scope of the claim.

Figure 1:
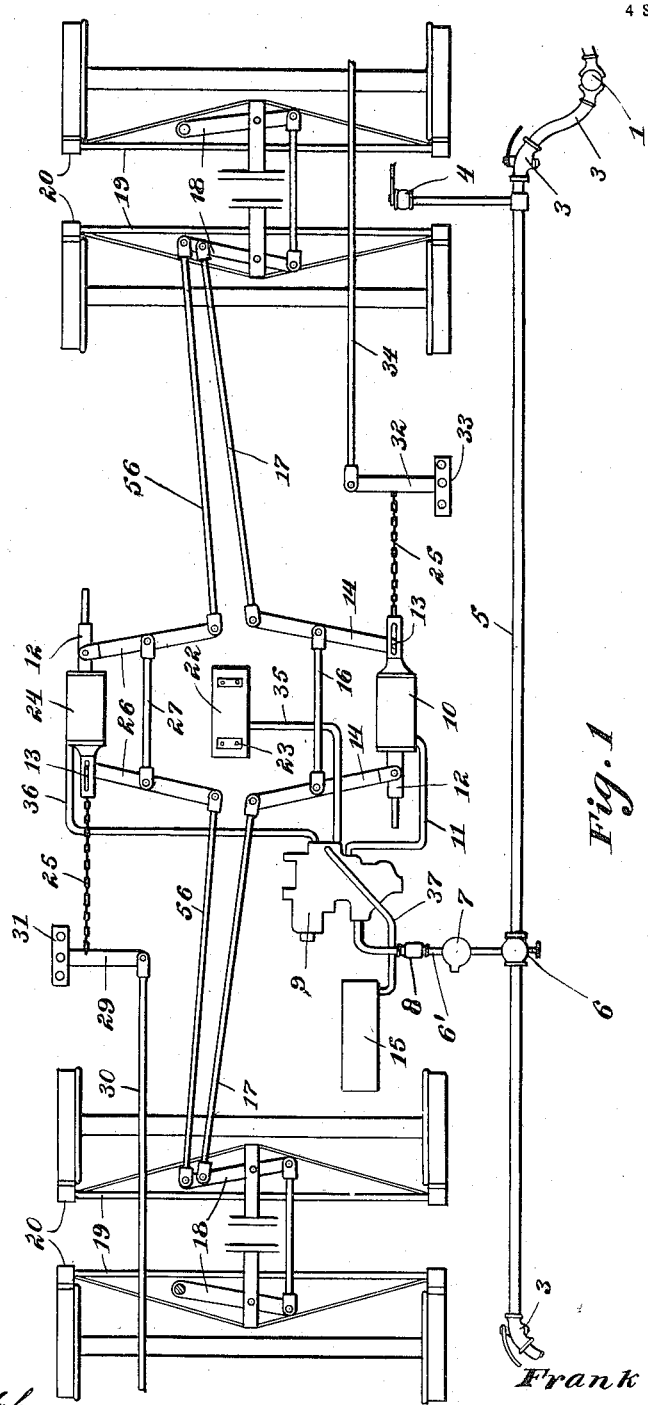
Figure 1 is a top plan diagrammatic view showing the arrangement of the brake mechanism upon a car.
Figure 2:
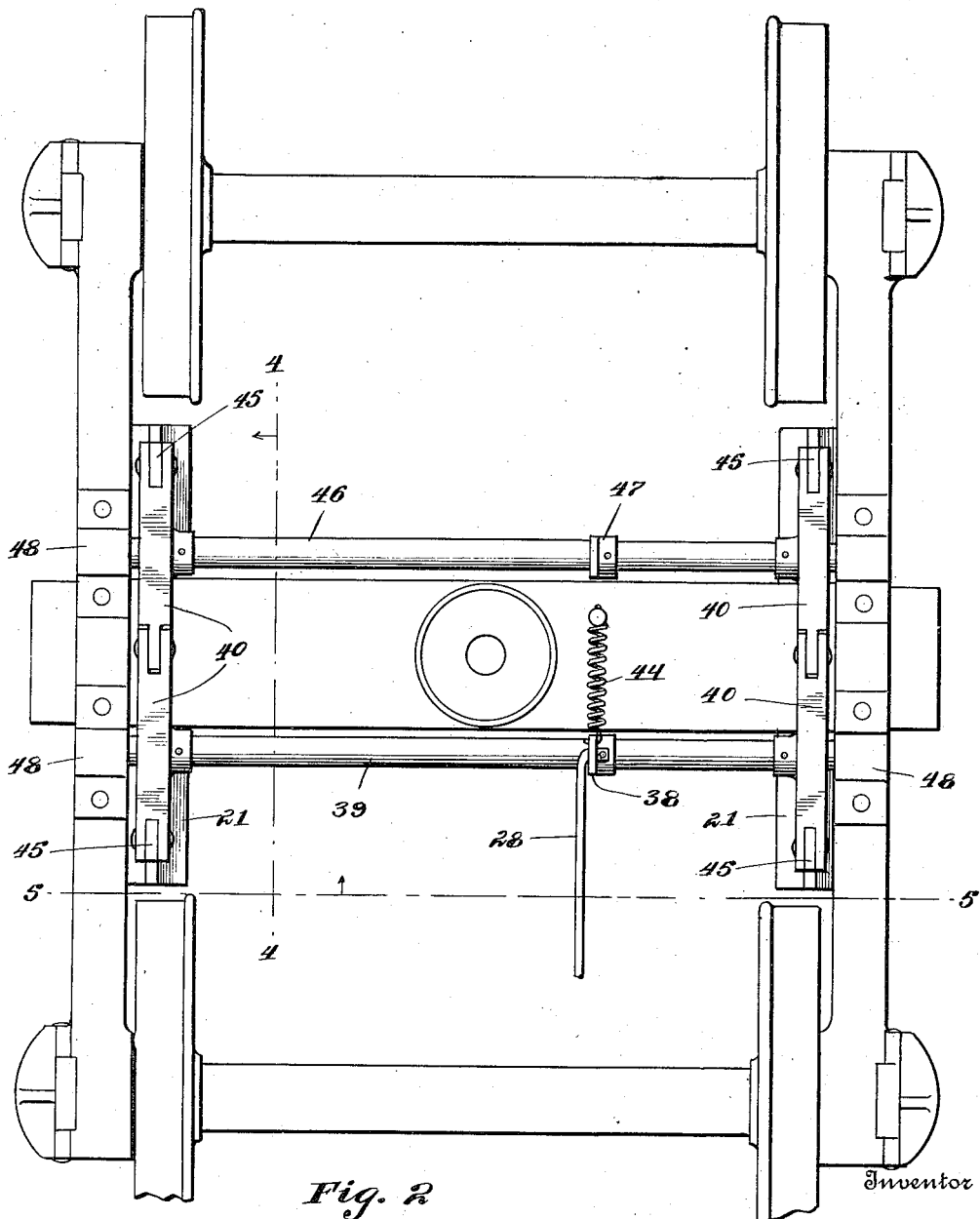
Fig. 2 is an enlarged top plan view of one of the trucks and associated parts.
Figure 3:
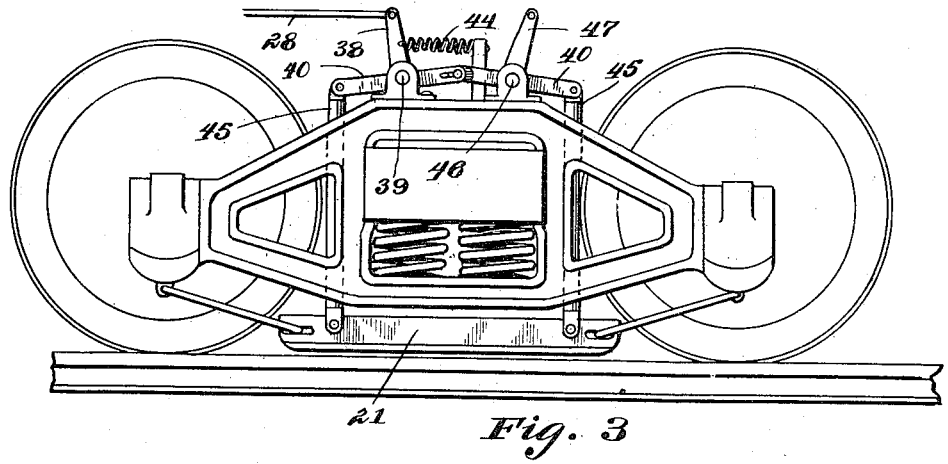
Fig. 3 is an enlarged side elevation of the same.
Figure 4:
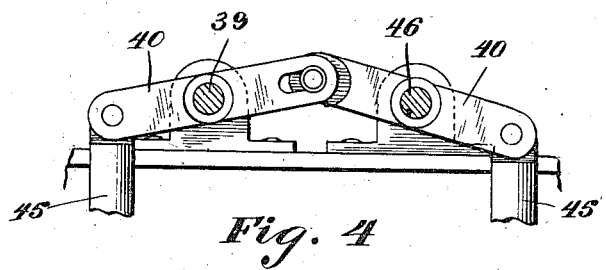
Fig. 4 is a fragmentary longitudinal sectional view therethrough.
Figure 5:
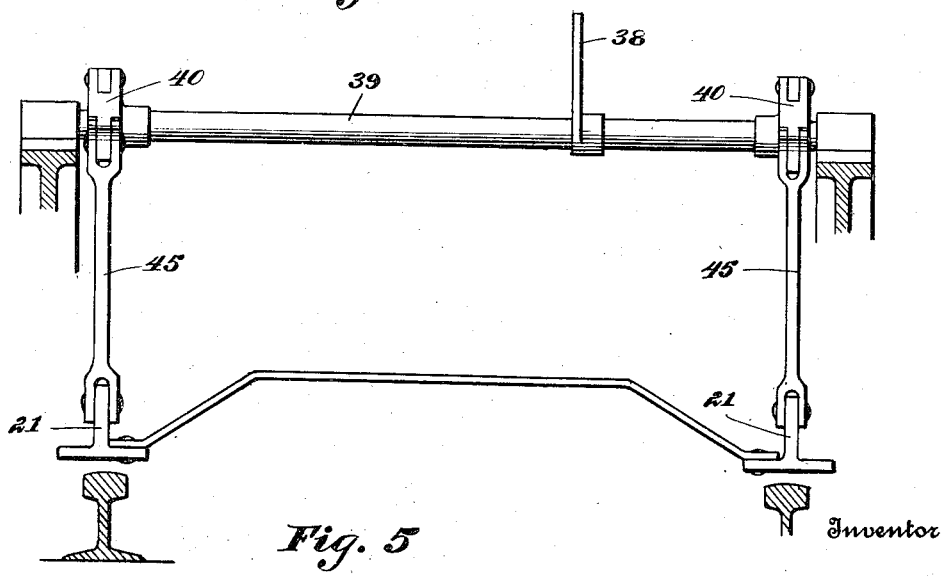
Fig. 5 is a fragmentary cross sectional view through the same.
Figure 6:
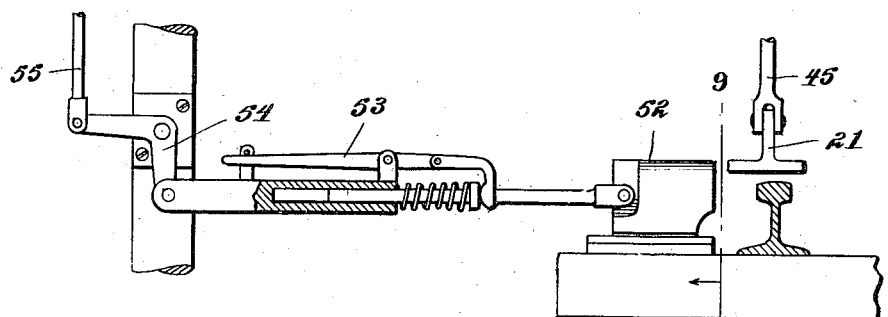
Fig. 6 is a diagrammatic view of the track obstacle and the connections between such obstacle and the adjacent signal blade, the trackway being shown in cross section.
Figure 7:
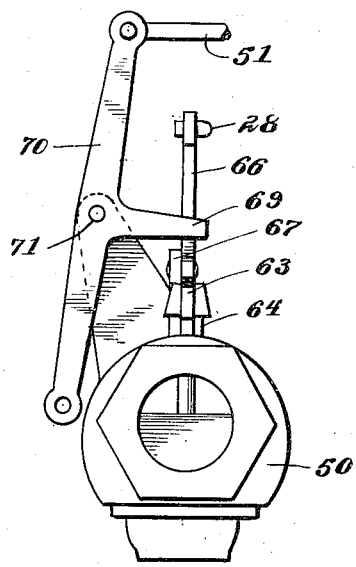
Fig. 7 is a view in elevation of the valve that is automatically opened when the train runs by a danger signal.
Figure 8:
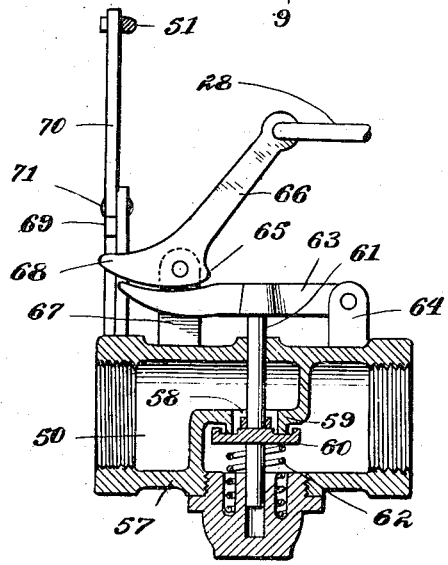
Fig. 8 is a longitudinal sectional view through the same.
Figure 9:
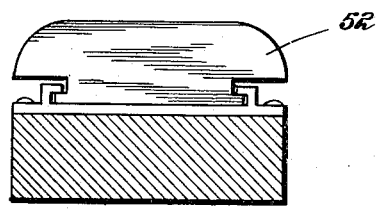
Fig. 9 is a view of a detail of the invention.

Referring now to the drawings in detail, 5 designates a brake pipe extending longitudinally of the car and equipped, at each end, with an angle cock 3 and an air hose 3' having one end connected to the angle cock 3 and the other end provided with a coupling 1 whereby the brake pipe on the car of the train may be coupled together to establish a continuous train line air pipe. Tapped onto the brake pipe 5 is a conductor's valve 4 whereby the pressure in the brake pipe may be reduced.

Suitably fastened to the frame of the car is a service reservoir 15 and leading from the service reservoir is a service reservoir pipe 37 connected to one port of a triple valve 9 and leading from another port of the triple valve 9 is a service cylinder pipe 11 connected to one end of a service cylinder 10 suitably fastened to the under side of the car. Tapped onto the brake pipe 5 is a pipe 6' connected to another port of the triple valve 9 and located in the pipe 6' is a cut out cock 6, a centrifugal dirt collector 7 and a strainer 8.

22 designates an emergency reservoir connected to the bottom of the car by means of brackets 23, while 24 indicates the emergency cylinder. Leading from another port in the triple valve 9 is a pipe 36 connected to one end of the emergency cylinder, while leading from the remaining port in the triple valve is a pipe 35 connected to the emergency reservoir 22. Mounted in each cylinder 10 and 24 is a piston held in non-braking position by a spring and capable of movement to braking position under the action of the air entering the cylinder and each piston is provided with a piston rod that extends outwardly through one end of the cylinder and secured to the outer end of each piston rod is a slotted cross head 13 and connected to the opposite end of the cylinder is a slack adjuster 12. 14, 14 indicate the service cylinder levers having the corresponding ends thereof connected to the piston rod and the slack adjuster respectively and the other ends connected through the medium of pull rods 17 with the service brake levers 18 located at the respective ends of the car and connected with service brake beams 19 extending across the trucks and equipped with brake shoes 20 adapted to engage the periphery of the wheel. 26, 26 designate the emergency cylinder levers having the corresponding ends thereof connected with the slack adjuster in the outer ends of the piston rods respectively and the other ends connected through the medium of emergency pull rods 56 with the respective brake levers 18. The brake levers 14 are interconnected by a cylinder rod 16, while the brake levers 26 are interconnected by a cylinder rod 27. The slotted cross head 13 connected with the service cylinder is connected through the medium of a chain 25 with a hand brake lever 32 fulcrumed at one end as at 33 upon a suitable bracket and having the other end connected with a hand brake rod 34, while the slotted cross head 13 connected with the piston rod of the piston in the emergency brake cylinder is connected through the medium of a chain 25 with a hand brake lever 29 fulcrumed at one end upon a suitable bracket 31 and having the other end connected with one extremity of a hand brake rod 30. Journaled in suitable horizontally alining bearings 48 carried by each truck are horizontal shafts 39 and 46 respectively and mounted upon the shaft 39 is a lever 38 projecting upwardly therefrom, while secured to the shaft 46 and projecting upwardly therefrom is a lever 47. Mounted upon the ends of each shaft 39, 46 are levers 40 respectively and the inner ends of adjacent levers 40 are pivotally connected to each other, while the outer ends thereof are connected through the medium of depending rods 45 with a shoe 21 suspended through the medium of rods 41, connected to the shoe and to the truck, above the rail of the track. Connected to the lever 38 is one end of a release spring 44 and the other end of this spring is connected to an adjacent part of the truck and acts to hold the shaft in normal position. Connected with the lever 38 is one end of a pull rod 28. 50 designates a safety valve embodying a body 57 having one end tapped into the brake pipe 5 and the other end opening into the atmosphere and formed centrally with an angular partition including a central portion extending longitudinally of the body 57 and formed with an opening 58 having the side wall upon one side of the partition formed to provide a valve seat 59 and engaging the valve seat 59 is a valve disk 60 equipped with a stem 61 and normally held against the seat by means of a coiled expansion spring 62 surrounding one end of the stem and engaging the valve. The other end of the stem 61 projects through the body 57 and is connected with the central portion of a lever 63 fulcrumed at one end upon a bracket 64 carried by the casing and having the other end disposed within the influence of the heel 65 formed upon one end of a lever 66 fulcrumed upon a bracket 67 carried by the valve body. This lever 66 is also formed with a toe 68 disposed within the path of movement of a lug 69 formed at the center of a lever 70 fulcrumed between its ends as at 71. The lever 70 66 is pivotally connected with the other end of the rod 28, while connected to the ends of the levers 70 and projecting toward the respective sides of the truck are release rods 51. When the rod 28 is pulled it will cause the heel 65 to engage lever 63 to open the valve 60 so that the train line will exhaust to the atmosphere, and thus apply the emergency brakes. Then by pulling on rod 51 the lever 70 is rocked to bring the projection 69 into contact with the toe 68 of lever 66 to return said lever to normal position and allow the valve 60 to close.

Arranged along the trackway and preferably disposed at the entrance to each block is a track shoe 52 capable of movement to active and inactive position and connected through the medium of release mechanism 53 with one leg of a bell crank lever 54, the other leg of the bell crank lever being connected through the medium of a rod 55 with the signal blade of the adjacent semaphore.

In operation, the train line air passes from the locomotive through the coupling 1, hose 2, angle cock 3, the brake pipe 5, the pipe 6′, the cut out cock 6, centrifugal dirt collector 7, strainer 8, triple valve 9, emergency reservoir pipe 35, into emergency reservoir 22, charging it to capacity and through service reservoir pipe 37 into service reservoir 15 charging it to capacity. The braking system is now ready for use. Any service reduction of air in the train pipe causes the service brake to operate and any quick reduction of air system causes the emergency brake to operate; that is, in using the emergency brakes, the service brakes are first used and then the emergency. When the engineer wishes to stop the train, he operates the engineer's brake valve in the locomotive cabin. This causes a reduction of pressure of air in the braking system, which operates control valve 9 which releases the air in service reservoir 15. The air passes from service reservoir pipe 37, control valve 9, service cylinder pipe 11, into service cylinder 10, forcing out piston which pushes on cylinder end of lever 14 and causes tension in service cylinder rod 16. This service cylinder rod 16 is to equalize the tension in both service pull rods 17. The two pull rod ends of lever 14 come toward each other causing tension in service pull rods 17 which pull on service brake levers 18 forcing service brake beams 19 at each end of which there is a brake shoe 20 against the wheels. This friction between brake shoes and wheels tends to stop the train. The foregoing operation must always be passed through before you come to the emergency braking system;

that is, the air must first pass through the different parts of the service braking system to set the service brakes before the emergency brakes can be set. When the air passes through the control valve 9 in setting the service brakes it places it in such a position that it is ready for emergency use. Now any quick reduction of air in the braking system throws the emergency system into operation. By opening the engineer's control valve to emergency position, or by opening the conductor's valve 4 or by safety signal shoe 21 trying to pass safety signal track shoe 52 or by truck leaving the track safety signal shoe 21 will be pushed up by hitting rail, or by truck leaving the track the wheels of truck will be embedded in the roadbed, forcing upward safety signal shoe 21 which pushes up on shoe push rod 45, through lever 40, shaft 39, lever 38, safety signal pull rod 28, opening the safety signal valve 50 to exhaust the train line. Any one of these foregoing operations causes a sudden reduction of air in braking system, throwing control valve 9 into operation. This valve now releases the air in the emergency reservoir 22, passes through emergency reservoir pipe 35, control valve 9, emergency cylinder pipe 36, enters emergency cylinder 24, and pushes out piston. This piston pushes on cylinder end of levers 26 and causes tension in emergency cylinder rod 27. This emergency cylinder rod 27 is to equalize the pull in both emergency pull rods 56. The two pull rod ends of levers 26 come toward each other, causing tension in emergency pull rods 56, thus pulling on lever 18, passing through brake beams 19, forcing brake shoe 20 tight against wheels. This extra strong friction between brake shoe and wheels causes the train to come to a sudden stop. When the train has come to a stop, the conductor or brakeman may pull on release rod 51 to close the valve 50, as before described, or conductor's valve 4 may be closed, or engineer may close his valve; whichever was used, thus fixing braking system for next operation.

In practice, I employ at least two shoes 21 on each locomotive, four shoes on each tender, and at least four shoes on each passenger coach or other car. Thus, it will be seen that the longer the train, the greater the safety. If one or more valves 50 should fail to work, the remaining valve being open would effect an application of the brakes, while, if for some reason, a broken flange or other obstruction on the track should cause the truck to leave the track, one or the other or both of the shoes 21 on the truck will strike the rail, thereby opening the valve with the effect to bring the train to a standstill. My improved apparatus may be installed on steam driven and electrically operated cars and will operate effectively under all conditions when brought into service.

While I have herein shown and described the preferred form of my invention by way of illustration, I wish it to be understood that I do not limit or confine myself to the precise details of construction herein described and delineated, as modification and variation may be made within the scope of the claim and without departing from the spirit of the invention.

I claim:

The combination with the train pipe of an air brake system, of a valve connecting the train pipe with the atmosphere, a pivoted lever engaging with the stem of said valve, a second lever having a toe and heel part adapted to engage with the first mentioned lever, a rod connecting with said second mentioned lever, a shoe carried by the truck and located above the rail, a sliding block, means for sliding said block close to the rail to contact with the shoe to force the same upwardly, means connected with said shoe for causing the rod to force the heel of the lever into contact with the first mentioned lever to open the valve when the block is moved into engagement or the train is derailed, and manually operated means engaging with the toe of the lever for returning the same to normal position.

In testimony whereof I affix my signature

FRANK A. RUSS.